United States Patent
Clapp et al.

(10) Patent No.: US 11,997,702 B2
(45) Date of Patent: May 28, 2024

(54) SYSTEMS AND METHODS FOR DYNAMIC UPLINK GRANT POLICY BASED ON MEDIUM ACCESS CONTROL ("MAC") PROTOCOL DATA UNIT ("PDU") PADDING

(71) Applicant: Verizon Patent and Licensing Inc., Basking Ridge, NJ (US)

(72) Inventors: Scott Clapp, Frisco, TX (US); Jonathan Daniel Bahta, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 15 days.

(21) Appl. No.: 17/545,689

(22) Filed: Dec. 8, 2021

(65) Prior Publication Data

US 2022/0104217 A1    Mar. 31, 2022

Related U.S. Application Data

(63) Continuation of application No. 16/832,237, filed on Mar. 27, 2020, now Pat. No. 11,224,055.

(51) Int. Cl.
*H04W 72/04* (2023.01)
*H04W 72/12* (2023.01)
*H04W 72/1268* (2023.01)
*H04W 72/21* (2023.01)
*H04W 72/50* (2023.01)

(52) U.S. Cl.
CPC ..... *H04W 72/535* (2023.01); *H04W 72/1268* (2013.01); *H04W 72/21* (2023.01)

(58) Field of Classification Search
None
See application file for complete search history.

(56) References Cited

U.S. PATENT DOCUMENTS

| | | | | |
|---|---|---|---|---|
| 2011/0207467 A1* | 8/2011 | Hanaki | ............... | H04W 72/52 455/450 |
| 2011/0310986 A1* | 12/2011 | Heo | ..................... | H04L 5/0055 375/259 |

(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.8.0 (Dec. 2019), Dec. 2019, pp. 83-88.

*Primary Examiner* — Sai Aung (57) ABSTRACT

A system described herein may provide a technique for maintaining and implementing a dynamic uplink grant policy for a User Equipment ("UE") connected to a base station of a radio access network ("RAN") of a wireless telecommunications network. The dynamic uplink grant policy may be based on historical utilization of radio frequency ("RF") resources granted to the UE, which may be based on a historical amount of padding (e.g., versus user plane data) included in uplink transmissions from the UE to one or more base stations associated with the wireless telecommunications network. The dynamic uplink grant policy may indicate an amount by which resource grants for a UE should be reduced, compared to an amount of resources requested by the UE.

20 Claims, 8 Drawing Sheets

(56) References Cited

U.S. PATENT DOCUMENTS

| | | | | |
|---|---|---|---|---|
| 2013/0107722 A1* | 5/2013 | Huang | ................ | H04W 72/51 |
| | | | | 370/241 |
| 2015/0173099 A1* | 6/2015 | Sun | ................ | H04L 1/1854 |
| | | | | 370/336 |
| 2016/0323772 A1* | 11/2016 | Wu | ................ | H04W 28/0252 |
| 2017/0086094 A1* | 3/2017 | Rajaee | ................ | H04W 76/16 |
| 2017/0111927 A1* | 4/2017 | Kim | ................ | H04W 72/21 |
| 2017/0289983 A1* | 10/2017 | Lei | ................ | H04W 72/21 |
| 2018/0176945 A1 | 6/2018 | Cao et al. | | |
| 2018/0199359 A1 | 7/2018 | Cao et al. | | |
| 2018/0227941 A1* | 8/2018 | Zhang | ................ | H04W 72/21 |
| 2018/0270799 A1 | 9/2018 | Noh et al. | | |
| 2018/0279348 A1* | 9/2018 | Huang | ................ | H04W 72/1263 |
| 2018/0279359 A1* | 9/2018 | Liu | ................ | H04W 28/0278 |
| 2019/0075584 A1 | 3/2019 | Li et al. | | |
| 2019/0159136 A1* | 5/2019 | MolavianJazi | ................ | H04W 72/21 |
| 2019/0261338 A1* | 8/2019 | Akkarakaran | ................ | H04W 72/046 |
| 2019/0357178 A1* | 11/2019 | Bae | ................ | H04L 5/0094 |
| 2020/0137785 A1* | 4/2020 | Deogun | ................ | H04W 72/569 |
| 2020/0196343 A1* | 6/2020 | Marinier | ................ | H04L 1/1896 |
| 2020/0260478 A1 | 8/2020 | Yang et al. | | |
| 2021/0076409 A1* | 3/2021 | Goto | ................ | H04W 4/70 |
| 2021/0360469 A1* | 11/2021 | Shrestha | ................ | H04W 72/21 |
| 2022/0158769 A1* | 5/2022 | Gou | ................ | H04L 5/0053 |
| 2022/0159674 A1* | 5/2022 | Deng | ................ | H04W 72/23 |

* cited by examiner

SYSTEMS AND METHODS FOR DYNAMIC UPLINK GRANT POLICY BASED ON MEDIUM ACCESS CONTROL ("MAC") PROTOCOL DATA UNIT ("PDU") PADDING

CROSS-REFERENCE TO RELATED APPLICATION

This Application is a Continuation of U.S. patent application Ser. No. 16/832,237, filed on Mar. 27, 2020, titled "SYSTEMS AND METHODS FOR DYNAMIC UPLINK GRANT POLICY BASED ON MEDIUM ACCESS CONTROL ("MAC") PROTOCOL DATA UNIT ("PDU") PADDING," the contents of which are herein incorporated by reference in their entirety.

BACKGROUND

Wireless user equipment ("UE"), such as mobile telephones or other wireless communication devices, may maintain a buffer for uplink data (i.e., data to be transmitted from the UE to a wireless network). The UE may communicate with a base station of a radio access network ("RAN") of the wireless network to indicate a status of the buffer, and/or to request radio frequency ("RF") resources (e.g., Physical Resource Blocks ("PRBs")), to allow for the transmission of the uplink data via the RAN. The RAN may allocate or "grant" resources, such as Physical Resource Blocks ("PRBs"), to the UE for the transmission of the requested uplink data.

DETAILED DESCRIPTION OF THE PREFERRED EMBODIMENTS

The following detailed description refers to the accompanying drawings. The same reference numbers in different drawings may identify the same or similar elements.

RANs of a wireless telecommunications network may include finite RF resources, which may be expressed as PRBs. Briefly, a PRB may refer to a particular amount of RF bandwidth over a given time window. A base station of a RAN (e.g., a Long-Term Evolution ("LTE") evolved Node B ("eNB"), a Fifth Generation ("5G") Next Generation Node B ("gNB"), and/or some other type of base station) may include a scheduler or other component that manages the granting of PRBs to UEs that are connected to the base station. For example, a UE may output a buffer status report ("BSR"), and/or some other type of message, requesting resources (e.g., PRBs) for a particular amount of uplink data from the UE. The request may indicate a quantity of data to be uploaded from the UE, such as a quantity of bytes (or an index that refers to a quantity or range of bytes).

Once uplink resources are granted to the UE (e.g., based on the BSR), the UE may transmit data in the amount of granted resources. The data may include user plane data, and/or may include "padding." User plane data may refer to voice call traffic, data traffic, or the like, associated with services provided by a core network that is communicatively coupled to the RAN. Padding may refer to the difference between the amount of granted resources and the amount of transmitted user plane traffic. For example, if an uplink grant for an amount of resources has the capacity to carry 100 bytes ("B") of data, and the UE transmits 30B of user plane data, the remaining 70B may be considered as padding. The uplink data may be transmitted from the UE as one or more Uplink-Shared Channel ("UL-SCH") Medium (or Media) Access Control ("MAC") Protocol Data Unit ("PDUs"). The MAC PDUs may include header information, indicating an amount of user data and/or an amount of padding.

In some situations, devices, such as Internet of Things ("IoT") devices, such as sensors, "smart" devices, or the like, may request more resources than are actually used. For example, an IoT device may request a fixed amount of uplink resources on a fixed interval, but may in practice transmit significantly less user plane data (e.g., sensor readings, alerts, etc.) than is actually requested. In other situations, other types of UEs may also request more resources than are actually used for user plane data, thus resulting in the inefficient use of RF resources associated with a RAN.

Embodiments described herein provide for the dynamic generation and modification of an uplink grant policy for a UE, in which the amount of RF resources granted for uplink data may be different (e.g., reduced) in comparison to the amount of RF resources requested by the UE (e.g., indicated by a BSR from the UE). For example, as described below, a URGC may maintain information indicating uplink resource utilization associated with a UE over time, and may dynamically generate or modify the uplink grant policy for the UE based on this utilization information. The utilization information may include, for example, a ratio of padding to user plane data in uplink traffic received from the UE (e.g., as indicated by UL-SCH MAC PDU header information). As described herein, the uplink grant policy may be modified in an ongoing manner based on monitoring utilization of uplink resources associated with the UE. As such, in accordance with embodiments described herein, RF resources associated with RANs of a wireless network may be efficiently utilized, while causing little or no impact on services provided to UEs connected to the RANs.

Figure 1:
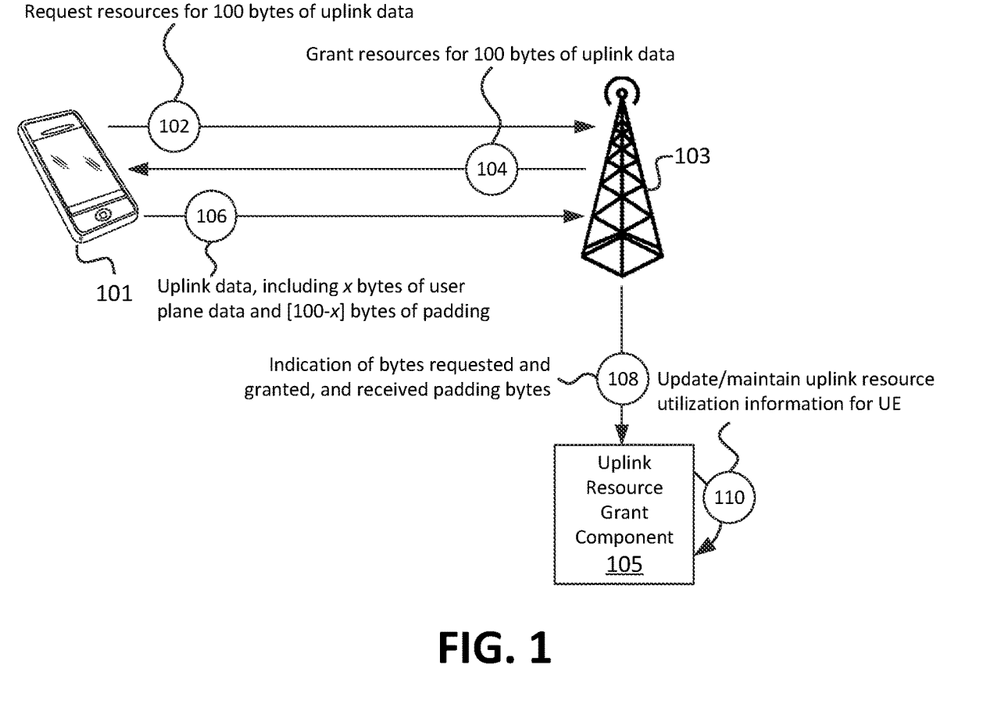
FIG. 1 illustrates an example of an Uplink Resource Grant Component ("URGC") maintaining or updating information indicating a dynamic uplink grant policy for a particular UE, based on a ratio of user plane data to padding data received from the UE, in accordance with some embodiments.

As shown in FIG. 1, for example, UE 101 may request (at 102) RF resources from base station 103. Base station 103 may be, for example, an eNB, a gNB, or other type of base station. The request (at 102) may be include, or may be in the form of a BSR or other suitable indication of an amount of requested uplink resources. In some embodiments, the request may indicate an amount of data (e.g., number of bytes) to be transmitted from UE 101. For example, the request may indicate a specific amount of data, such as 100 bytes (i.e., 100B), in this example, a range of amounts of data (e.g., between 92B and 107B), an index value that is mapped to a range of data (e.g., an index value of 16, mapped to a 92-107B range), or some other indicator of the amount of requested resources. Although RF resources (e.g., PRBs) are being requested, such requests will be described herein as a request for an amount of data, for the sake of brevity. Thus, for example, a request for suitable RF resources to accommodate X bytes of data will be referred to as a "request for X bytes of uplink data," or similar language.

In the example of FIG. 1, UE 101 may request (at 102) 100B of uplink data from base station 103. This request may be sent, for example, via a Physical Uplink Shared Channel ("PUSCH"), or some other suitable communication pathway. Based on this request, base station 103 may grant suitable RF resources to UE 101 for the requested 100B of uplink data. For example, base station 103 may allocate PRBs suitable to carry 100B (or more) of uplink data, and may notify (e.g., via a Physical Downlink Control Channel ("PDCCH") of the granted resources.

In some situations, one or more other factors may be used by base station 103 to determine the amount of resources to grant to UE 101 based on the request, such as Quality of Service ("QoS") parameters associated with UE 101, resource load or capacity of base station 103 (e.g., based on requests from other UEs), and/or other factors. For the sake of simplicity, these factors are not considered herein. That is, as discussed herein, the amount of uplink data granted to UE 101 may be based on the requested amount of data and the dynamically updated uplink grant policy for UE 101 described herein.

Based on the received uplink resource grant, UE 101 may output (at 106) uplink data to base station 103. In this example, the uplink data includes X bytes of user plane data, and [100−X] bytes of padding. As mentioned above, the uplink data may be sent (at 106) via one or more MAC PDUs, which may include header information indicating the amounts of user plane data and padding.

Base station 103 may output (at 108) an indication of the amount of data requested by UE 101 (100B, in this example), the amount of granted data (also 100B, in this example), as well as the utilization of the granted data. The utilization may be expressed in terms of the amount of user data and/or padding in the received uplink data from UE 101. For example, the utilization may be expressed as a ratio (e.g., ratio of padding to user data, or ratio of user data to padding), proportion (e.g., proportion of uplink data that is user data, proportion of uplink data that is padding), and/or in some other suitable manner.

URGC 105 may update and/or maintain (at 110) uplink resource utilization associated with UE 101. In some embodiments, URGC 105 may be communicatively coupled with base station 103 (e.g., via an application programming interface ("API") and/or some other suitable interface). In some embodiments, functionality described herein as being performed by URGC 105 may be performed by base station 103.

The uplink resource utilization information may include, and/or may be based on, granular data, such as per-grant utilization. For example, the per-grant utilization may indicate the utilization of RF resources in a set of uplink data sent in response to a particular grant (e.g., provided at 104), where each grant may correspond to a corresponding set of uplink data from UE 101. In some embodiments, the utilization information may be maintained over a period of time, and may reflect utilization over the period of time (e.g., average, mean, median, minimum, maximum, or some other calculated value). In this manner, URGC 105 may maintain historical utilization information associated with UE 101. Although described in the context of a single UE 101, similar concepts may apply for multiple UEs 101, where URGC 105 maintains uplink resource utilization information for each UE 101.

In some embodiments, URGC 105 may maintain such information on a rolling basis, and/or may weight older information less heavily than more recent information. For example, URGC 105 may maintain uplink resource utilization associated with UE 101 over the past week, and may not include information older than one week old when calculating the uplink resource utilization information for UE 101.

While discussed herein in the context of UE 101 connected to one base station 103, in practice, similar concepts may apply based on communications between UE 101 and multiple base stations 103. In this manner, URGC 105 may, for example, receive utilization information from multiple base stations 103, including a base station 103 to which UE 101 is currently connected.

Figure 2:
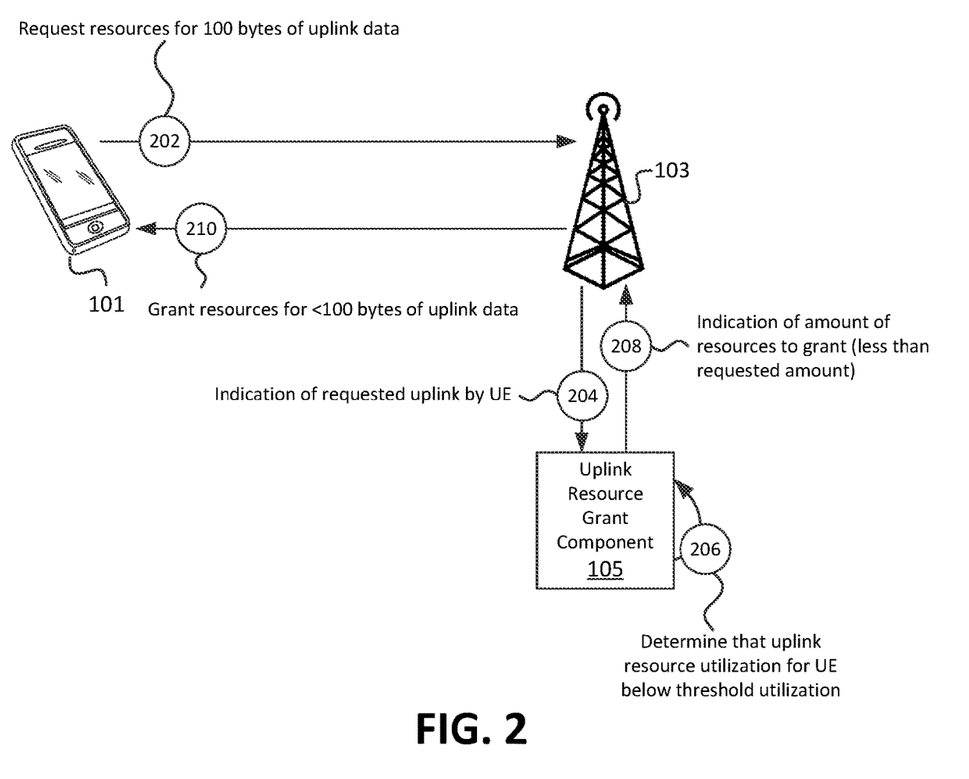
FIG. 2 illustrates an example of the URGC granting a different amount of uplink resources to a UE than an amount requested by the UE, based on a dynamic uplink grant policy associated with the UE, in accordance with some embodiments.

This utilization information may be used when determining whether to grant a requested amount of data to UE 101 for future requests. For example, as shown in FIG. 2, UE 101 may request (at 202) resources for 100B of data. Base station 103 may provide (at 204) an indication (e.g., to URGC 105) that UE 101 has requested 100B of uplink data (or, as discussed above, suitable RF resources with the capacity to carry 100B of data). URGC 105 may, based on receiving this indication, determine (at 206) an uplink resource utilization associated with UE 101. For example, in this instance, URGC 105 may determine that the uplink resource utilization associated with UE 101 is below a threshold utilization.

The threshold may be a static threshold, and/or may vary based on one or more factors. For example, different types of UEs may be associated with different thresholds. For example, URGC 105 may receive or maintain information mapping an identifier of UE 101 (e.g., an International Mobile Subscriber Identity ("IMSI") value, an International Mobile Station Equipment Identity ("IMEI") value, a MAC address, and/or some other suitable identifier) to a device type, and may determine the threshold based on this mapping. For example, IoT devices may be associated with one threshold, while mobile phones may be associated with a different threshold. In some embodiments, as discussed below, these thresholds may be determined or adjusted using machine learning and/or other suitable techniques.

Based on determining (at 206) that uplink resource utilization associated with UE 101 is below the threshold utilization, URGC 105 may determine that fewer resources than the amount requested (at 202) should be granted to UE 101. URGC 105 may determine an amount to grant, which may be based on the average utilization associated with UE 101. For example, if the average utilization associated with UE 101 is 40% (e.g., over time, 40% of uplink data from UE 101 was user data and 60% was padding), URGC 105 may determine that 40% of the requested amount should be granted. As another example, URGC 105 may steadily decrease the amount of granted resources as utilization of uplink resources associated with UE 101 is below the threshold. For example, after determining that one uplink transmission (e.g., in response to one grant) from UE 101 is below the threshold utilization, URGC 105 may reduce the next grant by a certain amount or percentage. If a subsequent uplink transmission from UE 101 is again below the threshold utilization, URGC 105 may adjust the amount by reducing the next grant again by the certain amount (or a different amount).

In some embodiments, URGC 105 may reduce the granted resources based on an average (or median, minimum, maximum, etc.) amount of uplink data from UE 101 over time. For example, if uplink transmissions from UE 101 contain an average of 40B of data, URGC 105 may determine that 40B (or an amount that is based on 40B, such as 45B) should be granted to UE 101, regardless of the amount of uplink resources requested by UE 101.

URGC 105 may output (at 208) an indication of the determined amount of resources to grant, based on the request (at 202) from UE 101. As discussed above, the determined amount may be less than the amount requested by UE 101. Accordingly, base station 103 may grant (at 210) resources in the amount determined by URGC 105.

Figure 3:
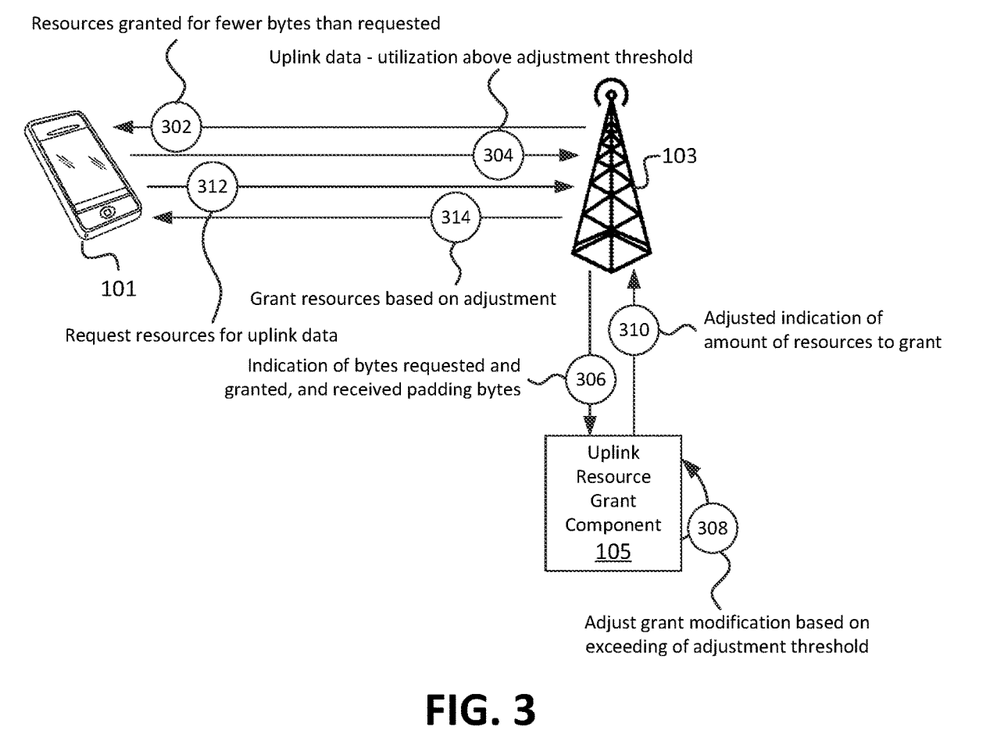
FIG. 3 illustrates an example of the URGC further updating a dynamic uplink grant policy associated with a UE based on receiving uplink data from the UE for which a ratio of padding data to user plane data is below an adjustment threshold.

As discussed above, the amount of the reduced grant may be modified based on subsequent uplink data received from UE 101. For example, as shown in FIG. 3, base station 103 may grant (at 302) an amount of resources to UE 101 that is lower than a requested amount of resources (e.g., as similarly discussed above with respect to 210). Based on this grant, UE 101 may output (at 304) uplink data to base station 103. In this example, the uplink data may have a utilization that exceeds an adjustment threshold. For example, the adjustment threshold may be a threshold based on which URGC 105 may adjust the amount of resources granted to UE 101 after reduced resources (e.g., compared to requested resources) have been granted to UE 101. For example, this adjustment threshold may be 95%, 100%, or some other suitable value. Generally, if this threshold is exceeded, the grant may have been reduced to an extent that performance of services associated with UE 101 may have been impacted (e.g., latency may be increased as a result of granting fewer resources than UE 101 requested).

Base station 103 may notify (at 306) URGC 105 of the amount of resources requested and granted, as well as the received padding amount (e.g., as similarly described above with respect to 108). URGC 105 may identify that the adjustment threshold associated with UE 101 has been exceeded by the uplink transmission (at 304), and may adjust (at 308) the uplink grant modification associated with UE 101. For example, if URGC 105 had previously determined that 40% of the requested resources should be provided to UE 101, URGC 105 may determine (at 108) that this amount should be increased to 45%. In subsequent iterations (e.g., if the adjustment threshold is exceeded by a subsequent transmission), URGC 105 may again adjust this amount to 50%.

In some embodiments, the amount of adjustment may be based on the utilization amount. For example, if URGC 105 identifies that the uplink transmission (at 304) had a 100% utilization (e.g., contained no padding), then URGC 105 may adjust the grant modification by a larger amount than if the uplink transmission had a 95% utilization. In some embodiments, when detecting utilization above a threshold amount (e.g., above 98%, 100%, etc.), URGC 105 may remove the grant modification associated with UE 101 (e.g., may allow base station 103 to grant the entire requested amount of resources to URGC 105) for subsequent transmissions.

After modifying the grant modification amount, URGC 105 may indicate (at 310) the modified grant modification amount to base station 103. Subsequently, UE 101 may request (at 312) resources for a subsequent transmission window, and may request a specified amount of resources (e.g., an amount of data to transmit). Base station 103 may grant (at 314) resources in accordance with the adjusted amount indicated (at 310) by URGC 105. For example, if base station 103 had previously granted (at 302) 40% of the requested resources, base station 103 may grant (at 314) 50%, 100%, or some other adjusted amount of the requested resources to UE 101.

Figure 4:
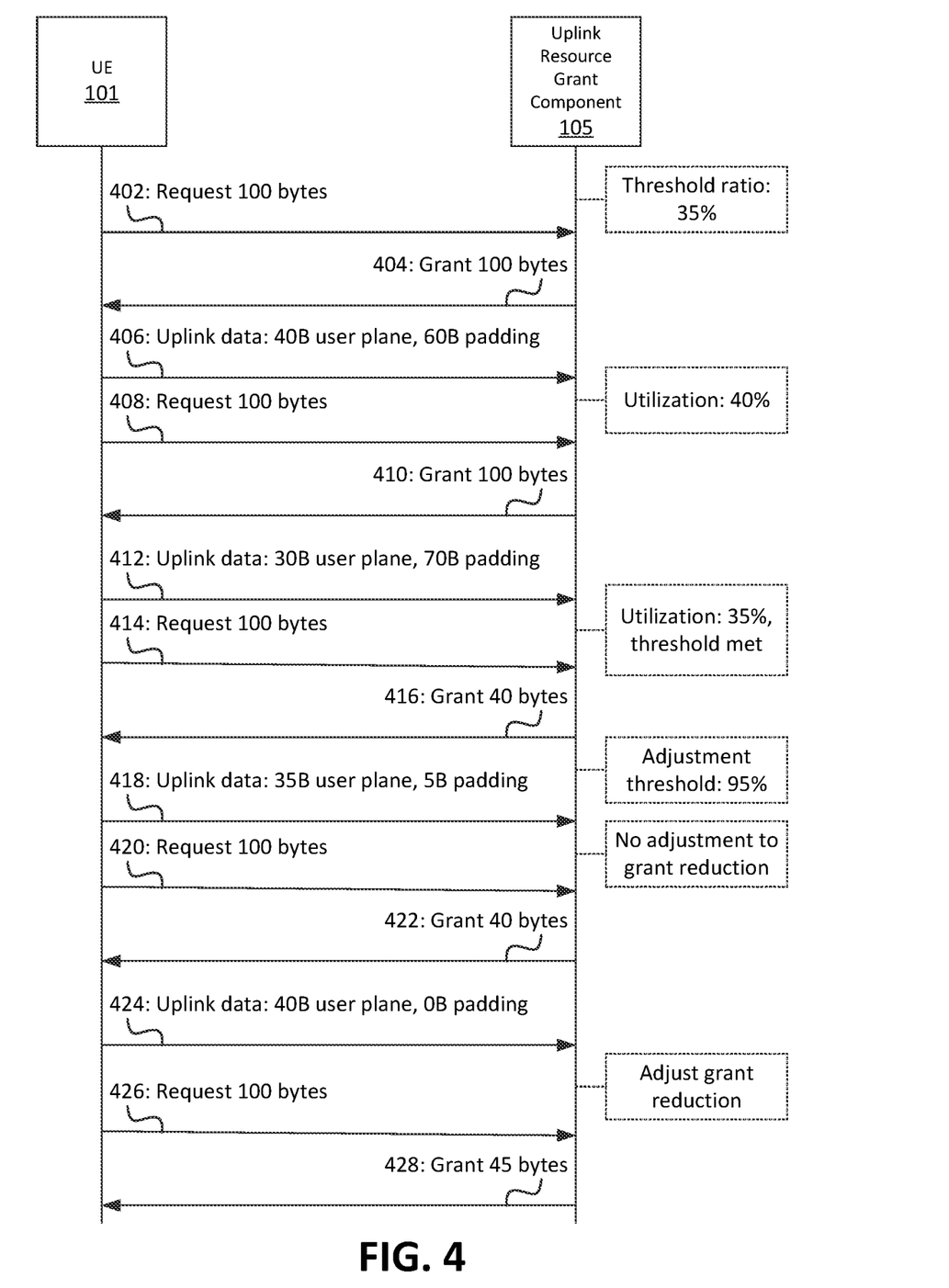
FIG. 4 illustrates an example scenario in which an uplink grant policy associated with a UE may be dynamically modified by a URGC, in accordance with some embodiments.

FIG. 4 illustrates an example sequence of grants and uplink data associated with UE 101. In this figure, UE 101 and URGC 105 are shown for the sake of simplicity. In practice, base station 103 may receive uplink data and resource requests from UE 101, provide utilization information to URGC 105, receive grant modification information from URGC 105, and may grant resources in accordance with the grant modification information (e.g., as similarly discussed above).

As shown, for example, UE 101 may output (at 402) a request to transmit 100B of data (e.g., a BSR or other suitable request for uplink resources that can carry 100B or more of data). An indication of this request may be received by URGC 105 (e.g., via base station 103). Further assume for this example that the threshold utilization based on which uplink grants for UE 101 should be modified is 35%. For example, if utilization information associated with UE 101 indicates that utilization (e.g., average, mean, etc. utilization over time) is below 35%, then grants for UE 101 should be reduced as compared to requested amounts.

Based on the request (at 402), URGC 105 may receive (at 404) information indicating that 100B was granted (e.g., by base station 103) to UE 101. Based on this grant, UE 101 may output (at 406) 100B of data, including 40B of user plane data and 60B of padding (i.e., a utilization of 40%). As the utilization is above the threshold (i.e., 40% utilization versus a 35% threshold), URGC 105 may not determine that reduced resources should be granted to UE 101. Additionally, or alternatively, URGC 105 may determine that reduced resources should not be granted to UE 101 (e.g., the requested amount of resources should be granted). As such, when UE 101 subsequently requests (at 408) resources for 100B of data, UE 101 may receive (at 410) a grant of resources for 100B of data.

In the ensuing uplink transmission, UE 101 may output (at 412) 30B of user plane data, and 70B of padding. Combined with the utilization from the earlier transmission (at 406), the average utilization associated with UE 101 may be 35%, which may meet the utilization threshold discussed above. Based on the utilization threshold being met, URGC 105 may adjust the amount granted to UE 101. For example, while UE 101 requested (at 414) resources for 100B of uplink data, 40B may be granted (at 416) to UE 101 (e.g., by base station 103).

In this example, the adjustment threshold is 95%. That is, if utilization by UE 101 is above 95%, URGC 105 may determine that the grant reduction amount for UE 101 should be changed, to allow for more resources for subsequent transmissions. In the ensuing uplink transmission (at 418), UE 101 may transmit 35B of user plane data, and 5B of padding (e.g., a utilization of 87.5%). As this utilization is less than the adjustment threshold, URGC 105 may not adjust the grant reduction amount for UE 101.

In a subsequent request for resources, UE 101 may request (at 420) resources for 100B of uplink data. As the grant reduction amount was not adjusted (e.g., based on the uplink transmission at 418), resources for 40B may again be granted (at 422) to UE 101. In the ensuing transmission, UE 101 may output (at 424) 40B of user plane data, and no padding (i.e., 100% uplink resource utilization). As this utilization exceeds the 95% adjustment threshold, URGC 105 may adjust the grant reduction amount. Thus, in response to a subsequent uplink resource request (at 426) for 100B, resources for 45B of data (e.g., higher than the previous 40B grants at 416 and 422) may be granted (at 428) to UE 101.

Figure 5:
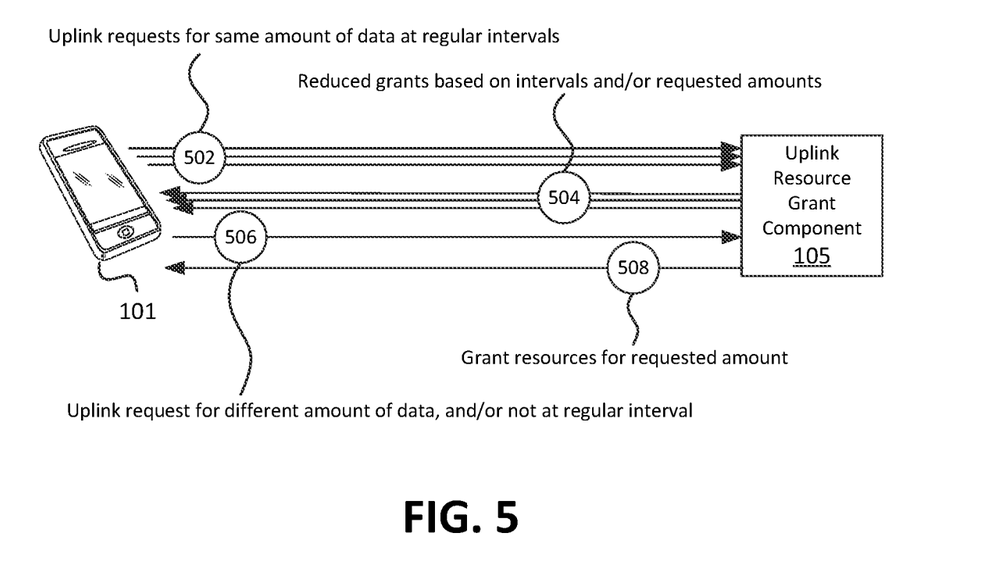
FIG. 5 illustrates an example of a URGC maintaining a dynamic uplink grant policy for a UE that treats uplink grant requests differently based on interval and/or amount of uplink resources requested.

In some embodiments, the manner in which uplink requests from UE 101 are received may affect the amount by which grants may be reduced in response to such requests. For example, as shown in FIG. 5, UE 101 may output (at 502) a series of uplink resource requests at regular intervals (e.g., every two minutes, every four minutes, etc.). Additionally, or alternatively, the series of uplink resource requests may be for the same amount of data. While the term "same" is used here, similar concepts may apply to "approximately the same" amounts of requested data, or intervals. For example, the "regular" interval may be satisfied if UE 101 outputs a request 2.1 minutes after the previous request, outputs the next request 1.9 minutes later, outputs the following request 2.0 minutes later, etc. That is, the precision by which URGC 105 detects the same amounts or intervals of uplink requests may vary, in some embodiments.

URGC 105 may determine, based on the regularity of the intervals and/or amounts of requested data, that grants that match this pattern (e.g., the pattern of intervals and/or requested amounts) should receive (at 504) reduced grants. Additionally, or alternatively, this reduction may be based on determining that an uplink resource utilization associated with UE 101 (e.g., average, median, etc. resource utilization) is below a threshold utilization.

As further shown, UE 101 may request (at 506) resources, where this request does not match the pattern of the requests (at 502). For example, the request (at 506) may be for a different amount of resources than the other requests (at 502), and/or may be received at a time that does not match the interval of the other requests. Based on determining that the request (at 506) does not match the pattern of the other requests (at 502), URGC 105 may determine that the requested amount of resources should be granted (at 508).

For example, the regular requests (at 502) may be the result of a programmatic or automatic request, such as the instance of an IoT device that is configured to make such requests, even when user plane data is not necessarily available for transmission. On the other hand, the request (at 506) may be related to a manual request from a user, and/or may be an automated or programmatic transmission of out-of-the-ordinary data (e.g., data relating to an emergency event).

Figure 6:
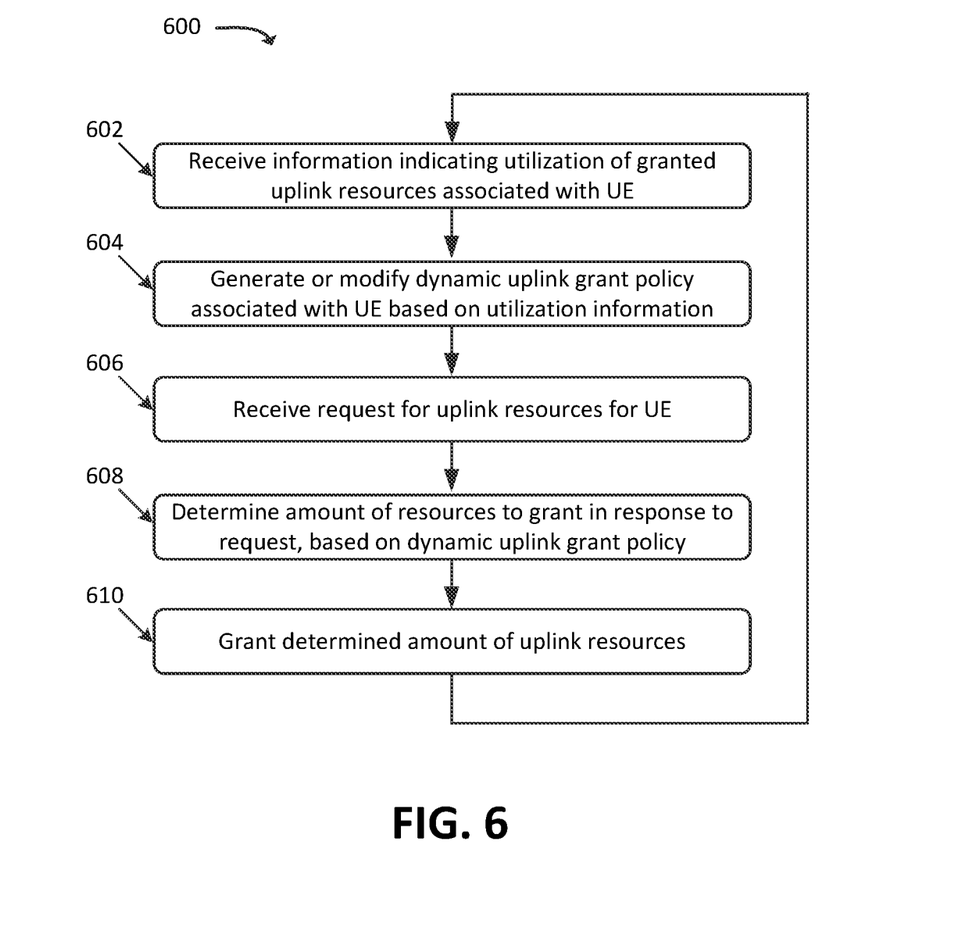
FIG. 6 illustrates an example process for maintaining a dynamic uplink grant policy for a UE and causing uplink resource grants to be provided to UE in accordance with the dynamic uplink grant policy, in accordance with some embodiments.

FIG. 6 illustrates an example process 600 for maintaining a dynamic uplink grant policy for a UE and causing uplink resource grants to be provided to UE in accordance with the dynamic uplink grant policy, in accordance with some embodiments. In some embodiments, some or all of process 600 may be performed by URGC 105. In some embodi- ments, one or more other devices may perform some or all of process 600 in concert with, and/or in lieu of, URGC 105 (e.g., base station 103).

As shown, process 600 may include receiving (at 602) information indicating utilization of granted uplink resources associated with UE 101. For example, as discussed above, URGC 105 may receive (e.g., from base station 103) information regarding one or more uplink resource requests from URGC 105 (e.g., in the form of BSRs or other suitable requests for RF resources that specify a requested amount of data or RF resources from base station 103). The requests may be provided via PUSCH, a Physical Uplink Control Channel ("PUCCH"), or other suitable communication pathway.

The utilization information may further indicate an amount of uplink resources provided to UE 101 based on each request (e.g., a quantity of PRBs, an amount of data that can be carried by the granted resources). The amount of resources granted may match the requested amount of resources, or may be a different amount (e.g., fewer resources granted than requested, or more resources granted than requested).

The utilization information may further indicate an amount of user plane traffic and/or padding included in uplink data transmitted by UE 101 based on the request. In some embodiments, the utilization information may be determined based on MAC PDU header or sub-header information in traffic transmitted by UE 101 using the granted resources, which may indicate an amount of data (e.g., expressed in bytes or some other suitable measure) of user plane traffic, and/or of padding.

Process 600 may further include generating and/or modifying (at 604) a dynamic uplink grant policy associated with UE 101 based on the received utilization information. For example, based on the received utilization information, URGC 105 may generate or modify information indicating a historical utilization of granted resources associated with UE 101. As discussed above, this historical information may include an average ratio of user plane data to padding over a given time window. In some embodiments, the time window may be a rolling time window, where older utilization information (e.g., information falling outside the rolling time window) is either not included in the calculation of the historical utilization information, and/or is weighted less heavily in the calculation of the historical utilization information.

As discussed above, generating or modifying the dynamic uplink grant policy may include determining whether the utilization information associated with UE 101 exceeds a threshold utilization. As similarly discussed, different thresholds may be associated with different factors. Such factors may include, for example, a device type of UE 101 (e.g., an IoT device, a mobile telephone, an Mobile-to-Mobile ("M2M") device, make and/or model of UE 101, and/or some other indicator of device type). Additionally, or alternatively, such factors may include attributes of UE 101, such as processor type or speed, amount of memory, operating system type or version, radio access technologies ("RATs") supported by UE 101, or other attributes of UE 101.

In some embodiments, such factors may include attributes or information associated with a subscription associated with UE 101. For example, the subscription information may be received from a Home Subscriber Server ("HSS"), Unified Data Management function ("UDM"), or other device or system that maintains subscription information for UEs associated with a wireless telecommunications network. The subscription information may include, for example, Quality of Service ("QoS")-related information, which may indicate levels of service (e.g., guaranteed minimum measures of latency, throughput, etc.) associated with UE 101. Such subscription information may be a factor in generating or modifying a dynamic uplink grant policy for UE 101, in that a UE 101 that is associated with a higher QoS level may receive resource grants that are closer to requested amounts than a UE 101 that is associated with a lower QoS level, given the same other circumstances. For example, if two example UEs 101 are associated with the same utilization level, a UE 101 with a subscription having a higher QoS level may receive resource grants that are closer to, or that match, requested amounts of resources than a UE 101 with a subscription having a lower QoS level.

URGC 105 may receive such information from a device or system that maintains UE attribute, subscription, or other suitable information. Such information may be correlated to one or more identifiers associated with UE 101, such as IMSI, IMEI, and/or some other suitable identifier. The information regarding UE 101 may be identified based on identifying a matching identifier in communications from UE 101, such as uplink data requests (e.g., BSRs) and transmitted data (e.g., via a UL-SCH).

In some embodiments, in addition to, or in lieu of determining whether utilization information exceeds one or more thresholds, the dynamic uplink grant policy may be determined on a sliding scale. For example, if a particular UE 101 is associated with a historical 60% uplink resource utilization, URGC 105 may determine that the dynamic uplink grant policy for the particular UE 101 should include granting the particular UE 101 60% of the resources requested by UE 101 for uplink transmissions. For example, the determined amount to grant to UE 101 may be different from the determined utilization of UE 101, but may be based on the utilization. For example, the determined utilization may be multiplied by a multiplier, to account for situations where UE 101 transmits more than the average amount of user plane data. In some embodiments, the multiplier may be based on a variance of the historic utilization associated with UE 101. For example, a particular UE 101 with a relatively high variance in its uplink resource utilization may have a higher multiplier than another UE 101 with a relatively low variance (or no variance) in its uplink resource utilization.

Process 600 may additionally include receiving (at 606) a request for uplink resources for UE 101. For example, at some time after the dynamic uplink grant policy is generated for UE 101, URGC 105 may receive an indication that UE 101 has requested a particular amount of uplink resources (e.g., from base station 103).

Process 600 may also include determining (at 608) an amount of resources to grant in response to the request from UE 101, based on the dynamic uplink grant policy associated with UE 101. For example, URGC 105 may determine an amount to grant based on a historical utilization associated with UE 101, such as whether UE 101's historical utilization (e.g., average utilization, median utilization, etc.) exceeds or does not exceed a threshold. Additionally, or alternatively, URGC 105 may determine an amount to grant using a sliding scale, based on the historical utilization associated with UE 101.

Process 600 may further include granting (at 610) the determined amount of uplink resources to UE 101. For example, URGC 105 may instruct base station 103 to grant the determined amount of resources to UE 101.

Some or all of operations 602-610 may iteratively repeat, such that the dynamic uplink policy for UE 101 may dynamically change over time, based on real-time changes in utilization of uplink resources by UE 101. In this manner, as discussed above, the dynamic uplink policy may be adjusted. For example, the dynamic uplink policy may be adjusted based on whether utilization associated with one or more received uplink transmissions from UE 101 exceed an adjustment threshold. Additionally, or alternatively, subsequent transmissions may factor in to the historical utilization associated with UE 101, based on which the dynamic uplink policy for UE 101 may be determined or adjusted.

Figure 7:
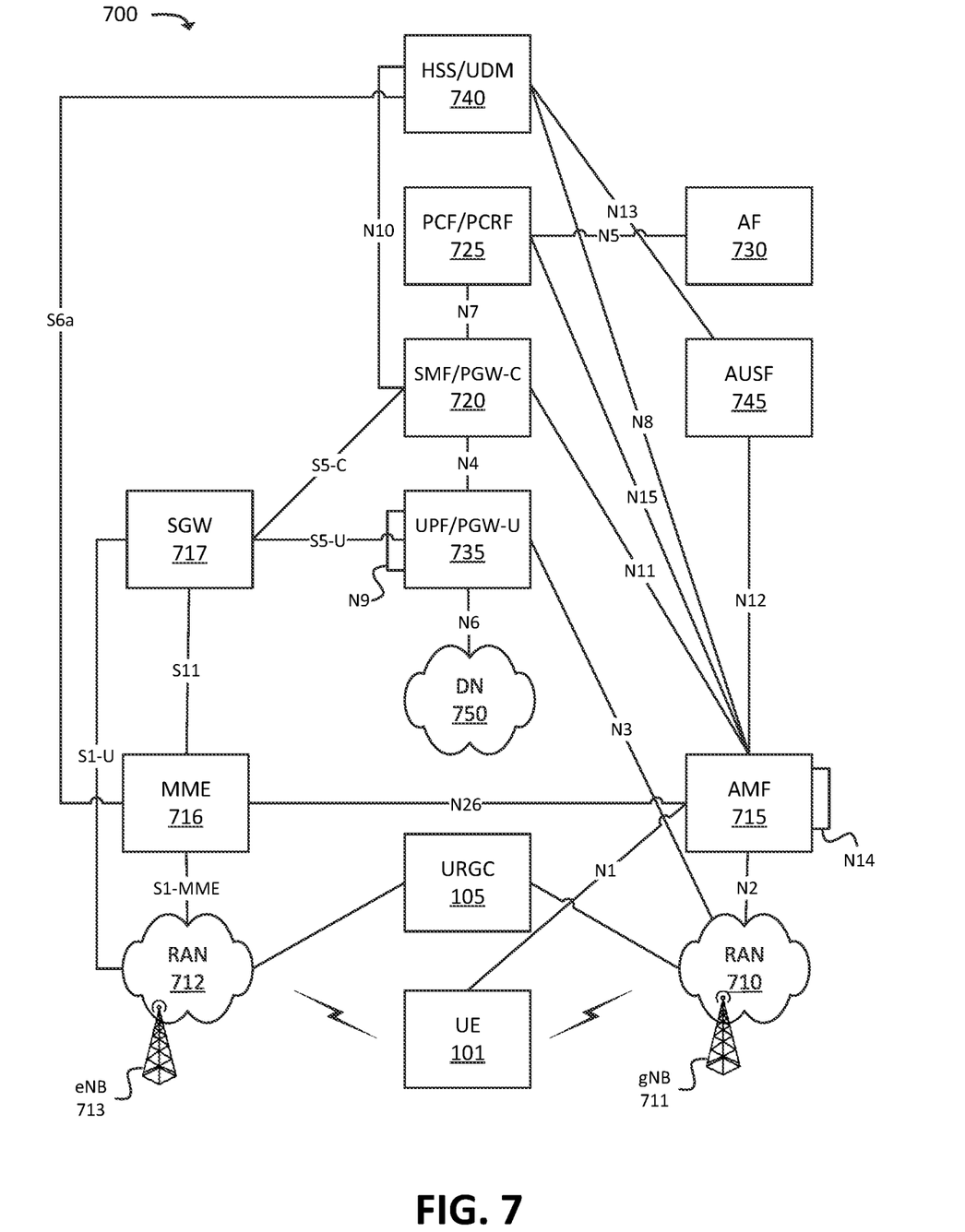
FIG. 7 illustrates an example environment in which one or more embodiments, described herein, may be implemented.

FIG. 7 illustrates an example environment 700, in which one or more embodiments may be implemented. In some embodiments, environment 700 may correspond to a 5G network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a LTE RAT), and/or in which elements of a 5G core network may be implemented by, may be communicatively coupled with, and/or may include elements of another type of core network (e.g., an evolved packet core ("EPC")). As shown, environment 700 may include UE 101, radio access network RAN 710 (which may include one or more gNBs 711), RAN 712 (which may include one or more one or more eNBs 713), Access and Mobility Management Function ("AMF") 715, Mobility Management Entity ("MME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, HSS/UDM 740, Authentication Server Function ("AUSF") 745, Data Network ("DN") 750, and URGC 105.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 101 may include a computation and communication device, such as a wireless mobile communication device that is capable of communicating with RAN 710 and/or DN 750. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, an Internet of Things ("IoT") device, or another type of mobile computation and communication device. UE 101 may send traffic to and/or receive traffic (e.g., user plane traffic) from DN 750 via RAN 710 and UPF/PGW-U 735.

RAN 710 may be, or may include, a 5G RAN that includes one or more base stations (e.g., one or more gNBs 711), via which UE 101 may communicate with one or more other elements of environment 700. UE 101 may communicate with RAN 710 via an air interface (e.g., as provided by gNB 711). For instance, RAN 710 may receive traffic (e.g., voice call traffic, data traffic, messaging traffic, signaling traffic, etc.) from UE 101 via the air interface, and may communicate the traffic to UPF/PGW-U 735, and/or one or more other devices or networks. Similarly, RAN 710 may receive traffic intended for UE 101 (e.g., from UPF/PGW-U 735, AMF 715, and/or one or more other devices or networks) and may communicate the traffic to UE 101 via the air interface. In some embodiments, gNB 711 may be, or may include, base station 103.

RAN 712 may be, or may include, an LTE RAN that includes one or more base stations (e.g., one or more eNBs 713), via which UE 101 may communicate with one or more other elements of environment 700. UE 101 may communicate with RAN 712 via an air interface (e.g., as provided by eNB 713). For instance, RAN 710 may receive traffic (e.g., voice call traffic, data traffic, messaging traffic, signaling traffic, etc.) from UE 101 via the air interface, and may communicate the traffic to UPF/PGW-U 735, and/or one or more other devices or networks. Similarly, RAN 710 may receive traffic intended for UE 101 (e.g., from UPF/PGW-U 735, SGW 717, and/or one or more other devices or networks) and may communicate the traffic to UE 101 via the air interface. In some embodiments, eNB 713 may be, or may include, base station 103.

AMF 715 may include one or more devices, systems, Virtualized Network Functions ("VNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 712 and/or eNBs 713, and/or to perform other operations.

SGW 717 may include one or more devices, systems, VNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, etc., that gather, process, store, and/or provide information in a manner described herein. SMF/PGW-C 720 may, for example, facilitate in the establishment of communication sessions on behalf of UE 101. In some embodiments, the establishment of communications sessions may be performed in accordance with one or more policies provided by PCF/PCRF 725.

PCF/PCRF 725 may include one or more devices, systems, VNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, etc., that receive, store, and/or provide information that may be used in determining parameters (e.g., quality of service parameters, charging parameters, or the like) for certain applications.

UPF/PGW-U 735 may include one or more devices, systems, VNFs, etc., that receive, store, and/or provide data (e.g., user plane data). For example, UPF/PGW-U 735 may receive user plane data (e.g., voice call traffic, data traffic, etc.), destined for UE 101, from DN 750, and may forward the user plane data toward UE 101 (e.g., via RAN 710, SMF/PGW-C 720, and/or one or more other devices). In some embodiments, multiple UPFs 735 may be deployed (e.g., in different geographical locations), and the delivery of content to UE 101 may be coordinated via the N9 interface (e.g., as denoted in FIG. 7 by the line marked "N9" originating and terminating at UPF/PGW-U 735). Similarly, UPF/PGW-U 735 may receive traffic from UE 101 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

HSS/UDM 740 and AUSF 745 may include one or more devices, systems, VNFs, etc., that manage, update, and/or store, in one or more memory devices associated with AUSF 745 and/or HSS/UDM 740, profile information associated with a subscriber. AUSF 745 and/or HSS/UDM 740 may perform authentication, authorization, and/or accounting operations associated with the subscriber and/or a communication session with UE 101.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 101 may communicate, through DN 750, with data servers, other UEs 101, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 101 may communicate.

URGC 105 may include one or more devices, systems, or VNFs that perform one or more operations performed herein. For example, URGC 105 may maintain or determine an uplink grant policy associated with one or more UEs 101. URGC 105 may communicate with elements of RANs 710 or 712 (e.g., gNB 711 or eNB 713). In some embodiments, URGC 105 may communicate with RANs 710 and/or 712 via an X2 interface. In some embodiments, some or all of the functionality described above with respect to URGC 105 may be performed by the same devices, systems, or VNFs that implement base station 103 (e.g., gNB 711, eNB 713, or some other type of base station). In some embodiments, URGC 105 may communicate with one or more other devices, systems, or VNFs described above via a suitable interface, such as a Network Exposure Function ("NEF") or a Service Capability Exposure Function ("SCEF") (not shown here for the sake of clarity).

Figure 8:
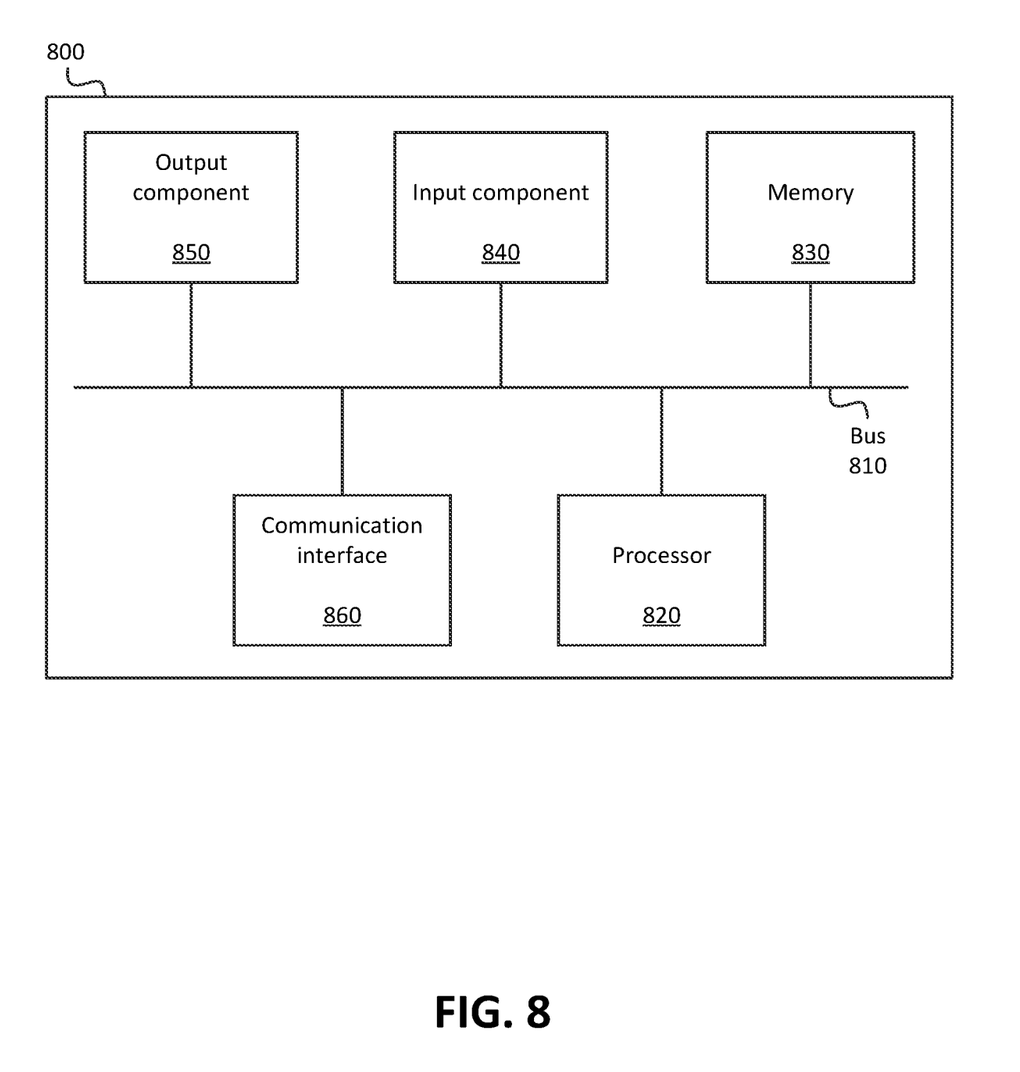
FIG. 8 illustrates example functional components of one or more devices, in accordance with one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:
1. A device, comprising:
one or more processors configured to:

identify a request for uplink resources from a User Equipment ("UE"), the request indicating a requested first amount of uplink resources;

determine a measure of historical utilization of granted uplink resources by the UE, wherein the measure of historical utilization is based on a proportion of uplink resources, that were previously granted to the UE, that were used by the UE to transmit user plane data;

determine, based on the measure of historical utilization of granted uplink resources by the UE, a second amount of uplink resources that is lower than the first amount of uplink resources, wherein a difference between the requested first amount of uplink resources and the second amount of uplink resources is determined based on the proportion of previously granted uplink resources that were used by the UE to transmit user plane data; and grant the determined second amount of resources to the UE in response to the request for uplink resources.

2. The device of claim 1, wherein the historical utilization of granted uplink resources indicates that uplink transmissions from the UE have utilized a lower amount of uplink resources for user plane data than a total amount of previously granted uplink resources.

3. The device of claim 2, wherein the one or more processors are configured to:

determine, based on the historical utilization of granted uplink resources associated with the UE, a historical proportion of padding versus user plane data in the one or more uplink transmissions, wherein the second amount of uplink resources is determined based on the determined historical proportion of padding versus user plane data in the one or more uplink transmissions.

4. The device of claim 3, wherein the second amount of uplink resources is determined based on determining that the historical proportion of padding versus user plane data in the one or more uplink transmissions exceeds a threshold proportion.

5. The device of claim 3, wherein the amount of padding in one or more uplink transmissions from the UE is determined based on header information included in one or more Medium Access Control ("MAC") Protocol Data Units ("PDUs") from the UE to the base station.

6. The device of claim 1, wherein the one or more processors are further configured to:

determine device attributes of the UE; and determine the second amount of uplink resources based on the determined device attributes of the UE.

7. The device of claim 1, wherein the one or more processors are further configured to:

determine, based on the historical utilization of granted uplink resources, that a historical measure of utilization by the UE is below a threshold utilization, wherein determining the second amount of uplink resources is further based on determining that the historical measure of utilization by the UE is below the threshold utilization.

8. A non-transitory computer-readable medium, storing a plurality of processor-executable instructions to:

identify a request for uplink resources from a User Equipment ("UE"), the request indicating a requested first amount of uplink resources;

determine a measure of historical utilization of granted uplink resources by the UE, wherein the measure of historical utilization is based on a proportion of uplink resources, that were previously granted to the UE, that were used by the UE to transmit user plane data;

determine, based on the measure of historical utilization of granted uplink resources by the UE, a second amount of uplink resources that is lower than the first amount of uplink resources, wherein a difference between the requested first amount of uplink resources and the second amount of uplink resources is determined based on the proportion of previously granted uplink resources that were used by the UE to transmit user plane data; and grant the determined second amount of resources to the UE in response to the request for uplink resources.

9. The non-transitory computer-readable medium of claim 8, wherein the historical utilization of granted uplink resources indicates that uplink transmissions from the UE have utilized a lower amount of uplink resources for user plane data than a total amount of previously granted uplink resources.

10. The non-transitory computer-readable medium of claim 9, wherein the one or more processors are configured to:

determine, based on the historical utilization of granted uplink resources associated with the UE, a historical proportion of padding versus user plane data in the one or more uplink transmissions, wherein the second amount of uplink resources is determined based on the determined historical proportion of padding versus user plane data in the one or more uplink transmissions.

11. The non-transitory computer-readable medium of claim 10, wherein the second amount of uplink resources is determined based on determining that the historical proportion of padding versus user plane data in the one or more uplink transmissions exceeds a threshold proportion.

12. The non-transitory computer-readable medium of claim 10, wherein the amount of padding in one or more uplink transmissions from the UE is determined based on header information included in one or more Medium Access Control ("MAC") Protocol Data Units ("PDUs") from the UE to the base station.

13. The non-transitory computer-readable medium of claim 8, wherein the plurality of processor-executable instructions further include processor-executable instructions to:

determine device attributes of the UE; and determine the second amount of uplink resources based on the determined device attributes of the UE.

14. The non-transitory computer-readable medium of claim 8, wherein the plurality of processor-executable instructions further include processor-executable instructions to:

determine, based on the historical utilization of granted uplink resources, that a historical measure of utilization by the UE is below a threshold utilization, wherein determining the second amount of uplink resources is further based on determining that the historical measure of utilization by the UE is below the threshold utilization.

15. A method, comprising:

identifying a request for uplink resources from a User Equipment ("UE"), the request indicating a requested first amount of uplink resources;

determining a measure of historical utilization of granted uplink resources by the UE, wherein the measure of historical utilization is based on a proportion of uplink resources, that were previously granted to the UE, that were used by the UE to transmit user plane data;

determining, based on the measure of historical utilization of granted uplink resources by the UE, a second amount of uplink resources that is lower than the first amount of uplink resources, wherein a difference between the requested first amount of uplink resources and the second amount of uplink resources is determined based on the proportion of previously granted uplink resources that were used by the UE to transmit user plane data; and granting the determined second amount of resources to the UE in response to the request for uplink resources.

16. The method of claim 15, wherein the historical utilization of granted uplink resources indicates that uplink transmissions from the UE have utilized a lower amount of uplink resources for user plane data than a total amount of previously granted uplink resources.

17. The method of claim 16, further comprising:
determining, based on the historical utilization of granted uplink resources associated with the UE, a historical proportion of padding versus user plane data in the one or more uplink transmissions,
wherein the second amount of uplink resources is determined based on determining that the historical proportion of padding versus user plane data in the one or more uplink transmissions exceeds a threshold proportion.

18. The method of claim 17, wherein the amount of padding in one or more uplink transmissions from the UE is determined based on header information included in one or more Medium Access Control ("MAC") Protocol Data Units ("PDUs") from the UE to the base station.

19. The method of claim 15, further comprising:
determining device attributes of the UE; and
determining the second amount of uplink resources based on the determined device attributes of the UE.

20. The method of claim 15, the method further comprising:
determining, based on the historical utilization of granted uplink resources, that a historical measure of utilization by the UE is below a threshold utilization,
wherein determining the second amount of uplink resources is further based on determining that the historical measure of utilization by the UE is below the threshold utilization.

* * * * *